(12) United States Patent
Tsukamoto et al.

(10) Patent No.: US 10,216,675 B2
(45) Date of Patent: Feb. 26, 2019

(54) TECHNIQUES FOR ESTABLISHING AN EXTERNAL INTERFACE AND A NETWORK INTERFACE WITHIN A CONNECTOR

(71) Applicant: LENOVO (SINGAPORE) PTE. LTD., Singapore (SG)

(72) Inventors: Yasumichi Tsukamoto, Kanagawa-ken (JP); Luis Antonio Hernandez, Cary, NC (US); Tomoki Harada, Kanagawa-ken (JP); Daisuke Watanabe, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 72 days.

(21) Appl. No.: 15/184,751

(22) Filed: Jun. 16, 2016

(65) Prior Publication Data
US 2017/0364465 A1    Dec. 21, 2017

(51) Int. Cl.
| | |
|---|---|
| *G06F 13/10* | (2006.01) |
| *G06F 13/40* | (2006.01) |
| *G06F 13/38* | (2006.01) |
| *G06F 13/42* | (2006.01) |
| *H04L 12/933* | (2013.01) |

(52) U.S. Cl.
CPC ........ *G06F 13/4022* (2013.01); *G06F 13/385* (2013.01); *G06F 13/4282* (2013.01); *H04L 49/101* (2013.01)

(58) Field of Classification Search
None
See application file for complete search history.

(56) References Cited

U.S. PATENT DOCUMENTS

2015/0318728 A1*  11/2015  Ghosh .................. H02J 7/0052
                                                   320/107

* cited by examiner

*Primary Examiner* — Cheng Yuan Tseng
(74) *Attorney, Agent, or Firm* — Anthony P. Ng; Russell Ng PLLC

(57) ABSTRACT

A technique for establishing a network interface and an external interface in a connector is disclosed. A personal computer (PC) includes a device controller for controlling data transmission with a peripheral device and a network device, and a receptacle including multiple pins for connecting data channels of the device controller to the peripheral device through the external interface and the network device through the network interface. The PC further includes a crossbar switch for switching the data channels to establish the external interface and the network interface in the receptacle. The external interface complies with the USB standards, and the network interface complies with the Ethernet standards.

13 Claims, 11 Drawing Sheets

TECHNIQUES FOR ESTABLISHING AN EXTERNAL INTERFACE AND A NETWORK INTERFACE WITHIN A CONNECTOR

BACKGROUND OF THE INVENTION

1. Technical Field

The present invention relates to connectors in general, and particularly to a technique for establishing an external interface and a network interface within a connector.

2. Description of Related Art

A portable electronic device, such as a laptop personal computer (PC) or a tablet PC, can be used by itself in a mobile environment, and by connecting a peripheral device in an office environment. The peripheral device, such as an external display or a printer, may be connected, wirelessly or connected by, cable to a connector provided in a chassis of the portable electronic device. However, it is difficult to provide many connectors in the chassis of the portable electronic device. In addition, connecting multiple peripheral devices by cable on a case-by-case basis is cumbersome work for a user. Also, when many interfaces between a portable electronic device and a function extender or a peripheral device needs to be established, each connector grows in size or the number of connectors increases, which makes it difficult to mount the connectors.

Consequently, it would be desirable to provide a technique for establishing as many interfaces as possible in one single connector that is included in a portable electronic device.

SUMMARY OF THE INVENTION

In accordance with a preferred embodiment of the present invention, an electronic device includes a device controller, a first receptacle and a crossbar switch. The device controller includes a data channel for an external interface with a peripheral device and a data channel for a network interface with a network device. The first receptacle can simultaneously establish the data channel for the external interface and the data channel for the network interface. The crossbar switch can switch between the two data channels of the device controller in order to establish the external interface and the network interface in the first receptacle.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Definition

The term electronic device corresponds to an information terminal device such as a desktop computer, a laptop computer, a tablet terminal or a smart phone.

The term function extender is a device connected to an electronic device to extend the function of the electronic device. The function extender may also be called a docking station, a port replicator, or a dangle. The function extender is provided with at multiple connectors for establishing data channels between peripheral devices and the electronic device.

Each peripheral device can be used by connecting to a connector provided in a chassis of an electronic device or function extender, including a specific function to communicate with the electronic device so as to perform recording, printing, displaying, or the like. A hard disk drive (HDD), a semiconductor memory, a printer, a display, and a Human Interface Device (HID) are examples of peripheral devices.

The term connector is a device capable of being removed without using any tool. A connector means a complex of a plug corresponding to a male device and a receptacle (also called a jack) corresponding to a female device, or either of them. Typically, the receptacle is connected to the electronic device and the plug is connected to a cable, but the mounting positions are not necessarily limited to particular positions in the present, invention. Applying the present invention makes it possible to connect devices to each other directly via a receptacle mounted in an electronic device and a plug mounted in the peripheral device.

The term external interface is the logical and physical existence that meets predetermined standards to establish a data channel between devices connected by cable. The external interface may establish the data channel inside the devices at the same time. A controller, a connector, a cable, and the like are included in a physical layer of the external interface. Examples of the external interface can include universal serial bus (USB), display port (DP), high-definition multimedia interface (HDMI), and PCIe.

The term network interface is the logical and physical existence that meets predetermined standards to establish a data channel with a network device connected by cable. The network interface includes a controller having roles as a physical layer and a data link layer, a connector, a cable, and the like. As an example of the network interface, there is the Ethernet.

Universal Serial Bus Type-C Cable and Connector Specification, Revision 1.1, Apr. 3, 2015, USB Implementers Forum, Inc. defines an universal serial bus (USB) connector called Type-C connector. A Type-C connector can establish USB 3.1 connection even if a plug is inserted upside down.

Signals to some pins of a Type-C connector is routed to operate in an alternate mode. When a dock adopting the alternate mode, PCIe transmission is performed simultaneously with USB 3.1 transmission via the Type-C connector.

II. Outline

Figure 1:
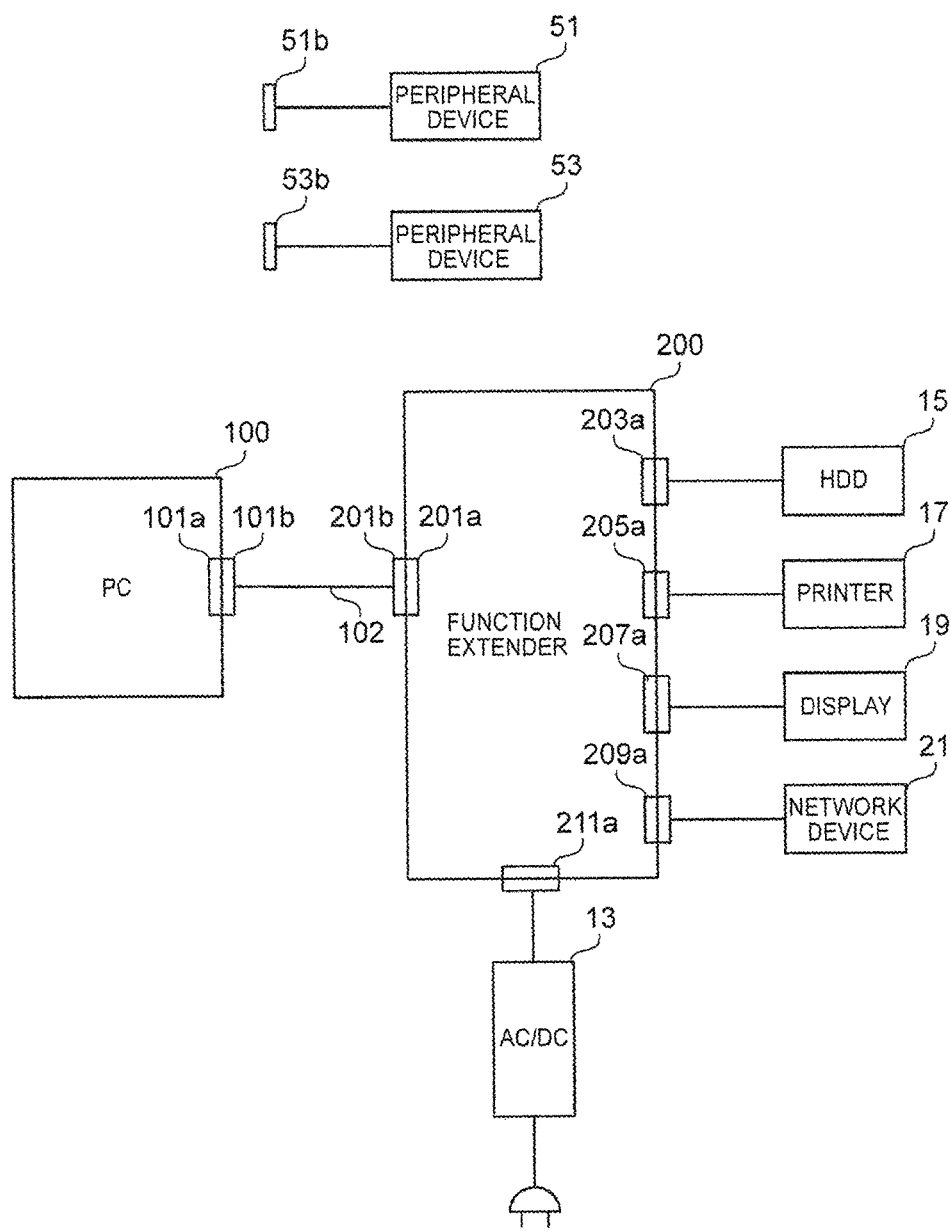
FIG. 1 is a block diagram showing multiple devices being connected to a laptop PC.

FIG. 1 is a block diagram showing a state where devices are connected to a laptop PC 100 that is an example of the electronic device. The PC 100 has a receptacle 101a mounted in a chassis thereof. Although the PC 100 may further have other receptacles mounted therein, it would be convenient to reduce the number of receptacles if many external interfaces and network interfaces can be established through the receptacle 101a. The receptacle 101a can be connected to a function extender 200 through a cable 102 via plugs 101b and 201b connected to both ends thereof.

In one example, the receptacle 101a can be a USB Type-C connector. However, the connector standard is not necessarily limited to the USB standard in the present invention. The plug can be connected to the receptacle 101a by such a flippable method or reversible method that, does not restrict the vertical direction at the connection, or by such an oriented method that restricts the vertical direction.

The function extender 200 can be connected to the receptacle 101a via the oriented Type-C plug 101b, and a peripheral device 51 can be connected via an oriented Type-C plug 51b. A peripheral device 53 can be connected to the receptacle 101a via a flippable Type-C plug 53b. In the oriented Type-C plugs 101b and 51b, not only a USB data channel but also a data channel for another external interface or a data channel for a network interface can be established at the same time. In the flippable plug 53b, only the USB data channel can be established.

Receptacles 201a to 209a and a power supply jack 211a are mounted in the function extender 200. Here, the receptacle 201a and the plug 201b constitute a USB Type-C connector. The receptacle 201a and the plug 201b may also be fixedly connected at both terminals as long as the data channel corresponding to the plug 101b can be established.

In one example, the receptacles 203a and 205a comply with the USB 3.1 standard, and the receptacle 207a complies with the DP standards. In one example, the receptacle 209a can be an RJ-45 that complies with the Ethernet (registered trademark) standards. USB devices such as an HDD 15 and a printer 17 are connected to the receptacles 203a and 205a. A display 19 is connected to the receptacle 207a, and a network device such as a router or a hub is connected to the receptacle 209a. In the receptacle 207a, a four-lane data channel can be established to connect a 4K display 19, or a two-lane data channel can be established to connect a 2K display 19. The HDD 15, the printer 17, and the display 19 correspond to peripheral devices.

An AC/DC adapter 13 is connected to the power supply jack 211a. The function extender 200 can supply power to the PC 100 through the cable 102. When not connected to the function extender 200, the PC 100 can receive power from an AC/DC adapter, not illustrated. The PC 100 connected to the function extender 200 can use the HDD 15, the printer 17, and the display 19 as peripheral devices, and can attach to a network, such as the Internet or an intranet, through a network device 21, according to a procedure to be described later while receiving the supply of power from the function extender 200.

III. Type-C Connector

Figure 2A:
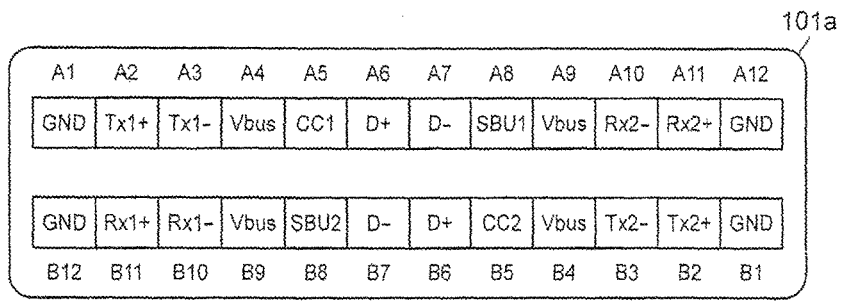
FIGS. 2A-2C show a normal pin configuration as defined in the USB standard for a Type-C connector.
Figure 2B:
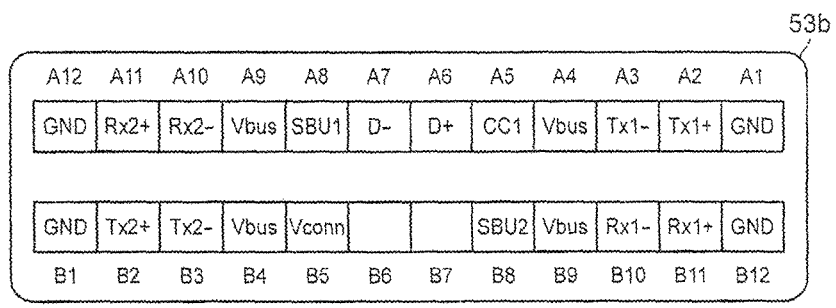
Figure 2C:
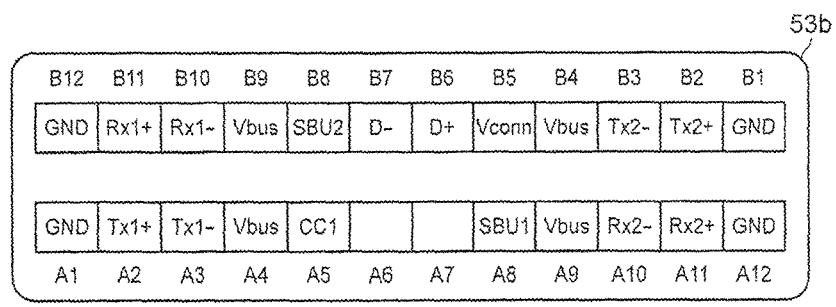

FIGS. 2A-2C show a normal pin configuration as defined for a Type-C connector in the USB standard. FIGS. 2A-2C illustrate the receptacle 101a and the flippable plug 53b, where 24 pins with pin numbers A1 to A12, and B1 to B12, and the intended uses defined for the pins are indicated by symbols. The receptacle 101a has 12 pins in each of upper and lower stages, respectively. Pins that define differential transmission Tx1+/−, Rx1+/−, Tx2+/−, and Rx2+/− are used for USB 3.1 data transmission.

Pins that define differential transmission D+/− are used for USB 2.0 data transmission. When USB 3.1 data transmission is performed, it is supposed to support USB 2.0 data transmission as well. CC1 and CC2 pins are used to detect the insertion direction of the plug 53b, detect a parameter for the supply of power through a V bus, identify the port of a peripheral device, perform communication, and the like. SBU1 and SBU2 pins are used for data transmission in an alternate mode alternative to normal USB 3.1 data transmission.

In the USB 3.1 data transmission, since only one differential transmission pair Tx/Rx of two differential transmission pairs Tx1/Rx1 and Tx2/Rx2 are used, and only one of the two differential transmission D+/− is used, the connection can be established even if the plug 53b is inserted upside down (and hence right side left). This connection corresponds to flippable connection as previously described. The PC 100 monitors the CC1 pin and the CC2 pin periodically, and when a peripheral device 51 is connected, determines the vertical direction of the plug to configure the receptacle 101a to be able to perform data transmission correctly.

The plug 53b with the CC1 pin terminated by termination resistance is connected in either of the vertical directions illustrated in FIG. 2B or FIG. 2C. The plug 53b uses pin numbers A2, A3, B10, and B11 for USB 3.1 data transmission, and uses either a pair of pin numbers A6 and A7 or a pair of pin numbers B6 and B7 for USB 2.0 data transmission. When the termination resistance is recognized at the A5 pin of the receptacle 101a, the PC 100 recognizes that the plug 53b is connected in the vertical direction (normal direction) of FIG. 2B. When the termination resistance is recognized at the B5 pin of the receptacle 101a, the PC 100 recognizes that the plug 53b is connected in the vertical direction (reverse direction) of FIG. 2C.

When the plug 53b is connected in the normal direction, pins with the same pin numbers as those of the receptacle 101a are connected to one another. The PC 100 establishes USB 3.1 data channels via the pin numbers A2, A3, B10, and B11 of the plug 53b, and establishes USB 2.0 data channels via the pin numbers A6 and A7. When the plug 53b is connected in the normal direction, the peripheral device 53 does not use the pin numbers B6 and B7. The PC 100 uses the pin number A5 (CC1) of the receptacle 101a for communication, and configures the pin number B5 (CC2) as Vconn to supply power to the electronic device accommodated via the cable 102.

When the plug 53b is connected in the reverse direction, the pins with the pin numbers B1 to B12, and A1 to A12 of the plug 53b are connected to the pins with the pin numbers A1 to A12, and B1 to B12 of the receptacle 101a. The PC 100 establishes USB 3.1 data channels via the pin numbers A10, A11, B2, and B3, and establishes USB 2.0 data channels via the pin numbers A6 and A7.

When predetermined termination resistance is recognized at the pin number A5 of the plug 53b, the PC 100 uses the pin number B5 (CC2) of the receptacle 101a for communication, and configures the pin number A5 (CC1) as Vconn of the cable 102 to supply power to the electronic device. Thus, the PC 100 performs routing processing for selecting a pin used for a USB 3.1 data channel and a CC pin depending on the insertion direction of the flappable plug 53b.

IV. PC Configuration

Figure 3:
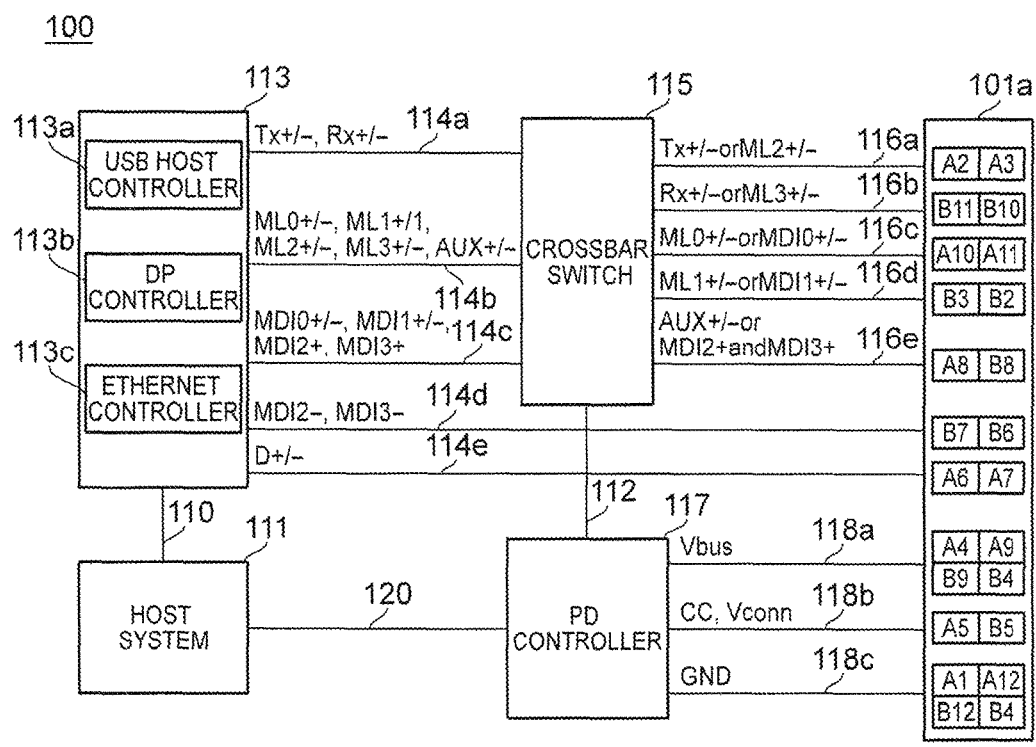
FIG. 3 is a block diagram of a personal computer.

FIG. 3 is a block diagram showing the configuration of the PC 100. The PC 100 includes a host system 111, a device controller 113, crossbar switch 115, a PD (power delivery) controller 117, and the receptacle 101a. The host system 111 is connected to the device controller 113 through a data bus 110.

The host system 111 includes hardware resources such as a CPU, a system memory, an I/O chipset, and a non-volatile memory, and software resources such as application programs, an operating system (OS), and device drivers. The device controller 113 includes device drivers and firmware to control communication with peripheral devices and network devices according to instructions from the host system 111.

In one example, the device controller 113 includes a USB host controller 113a, a DP controller 113b, and an Ethernet controller 113c. The device controller 113 may further include any other controller such as PCIe or HDMI so that a data channel therefor can be established in the receptacle 101a. The USB host controller 113a, the DP controller 113b, and the Ethernet controller 113c may be separated in terms of hardware.

Each of the USB host controller 113a, the DP controller 113b, and the Ethernet controller 113c converts data received from the host system 111 into a format that complies with the external interface standard, respectively, and outputs the data to the crossbar switch 115 and the receptacle 101a. The USB host controller 113a and the Ethernet controller 113c convert the format of data received from a peripheral device connected to the function extender 200 or the peripheral device 51, 53 directly connected to the receptacle 101a, and send the data to the host system 111.

The USB host controller 113a includes data channels for differential transmission Tx+/−, Rx+/−, and D+/−. The DP controller 113b includes data channels for differential transmission ML0+/−, ML1+/−, ML2+/−, ML3+/−, and AUX+/−. The Ethernet controller 113c includes data channels for differential transmission of MDI0+/−, MDI1+/−, MDI2+/−, and MDI3+/−.

The device controller 113 and the crossbar switch 115 are connected through data channels 114a to 114c. The device controller 113 and the receptacle 101a are connected through data channels 114d and 114e. The crossbar switch 115 and the receptacle 101a are connected through data channels 116a to 116e. The PD controller 117 is connected to the host system 111 through a serial bus 120, and connected to the crossbar switch 115 through a serial bus 122.

The PD controller 117 is connected to the receptacle 101a through a power line 118a, a CC line 118b, and a ground line 118c. The data channel 114a transmits USB 3.1 differential transmission signals Tx+/− and Rx+/−. The data channel 114b transmits differential transmission signals ML0+/−, ML1+/−, ML2+/−, ML3+/−, and AUX+/−. The data channel 114c transmits differential transmission signals MDI0+/− and MDI1+/−, an MDI2+ signal configuring differential transmission signals MDI2+/−, and an MDI3+ signal configuring differential transmission signals MDI3+/−.

The data channel 114d transmits, to the B6 pin and the B5 pin, an MDI2− signal configuring differential transmission signals MDI2+/−, and an MDI3− signal configuring differential transmission signals MDI3+/−. The data channel 114e transmits D+/− signals to the A6 and A7 pins. The PD controller 117 monitors the A5 pin and the B5 pin periodically to recognize the direction of the flippable plug 53b connected to the receptacle 101a in order to configure either one of the pins as a CC signal transmission path and the other as the power supply (Vconn).

With regard to the function extender 200 and the peripheral device 51 connected via the oriented plug 101b, 51b, for example, the PD controller 117 always uses the A5 pin for CC signals, and uses the B5 pin for Vconn power. The PD controller 117 recognizes the function extender 200 or the peripheral device 51, 53 connected to the receptacle 101a by a CC signal. When the peripheral device 53 is connected to the receptacle 101a, the PD controller 117 controls the action of the crossbar switch 115 to establish the data channel described with reference to FIGS. 2A-2C. When the function extender 200 operating with plural external interfaces or the peripheral device 51 is connected to the receptacle 101a, the PD controller 117 can control the crossbar switch 115 according to an instruction from the host system 111.

In one example, the host, system 111 instructs the PD controller 117 of either of four output modes, namely a USB 3.1 mode, a USB 3.1+DP mode, a USB 2+DP mode, and a USB 3.1+Ethernet mode. According to the instructed output mode, the crossbar switch 115 switches (routes) the data channels 114a to 114c to establish the data channels 116a to 116e so as to configure the receptacle 101a. When the output mode is the USB 3.1+Ethernet mode, the host system 111 instructs the device controller 113 to establish MDI2- and MDI3-data channels in the data channel 114d.

Figure 4:
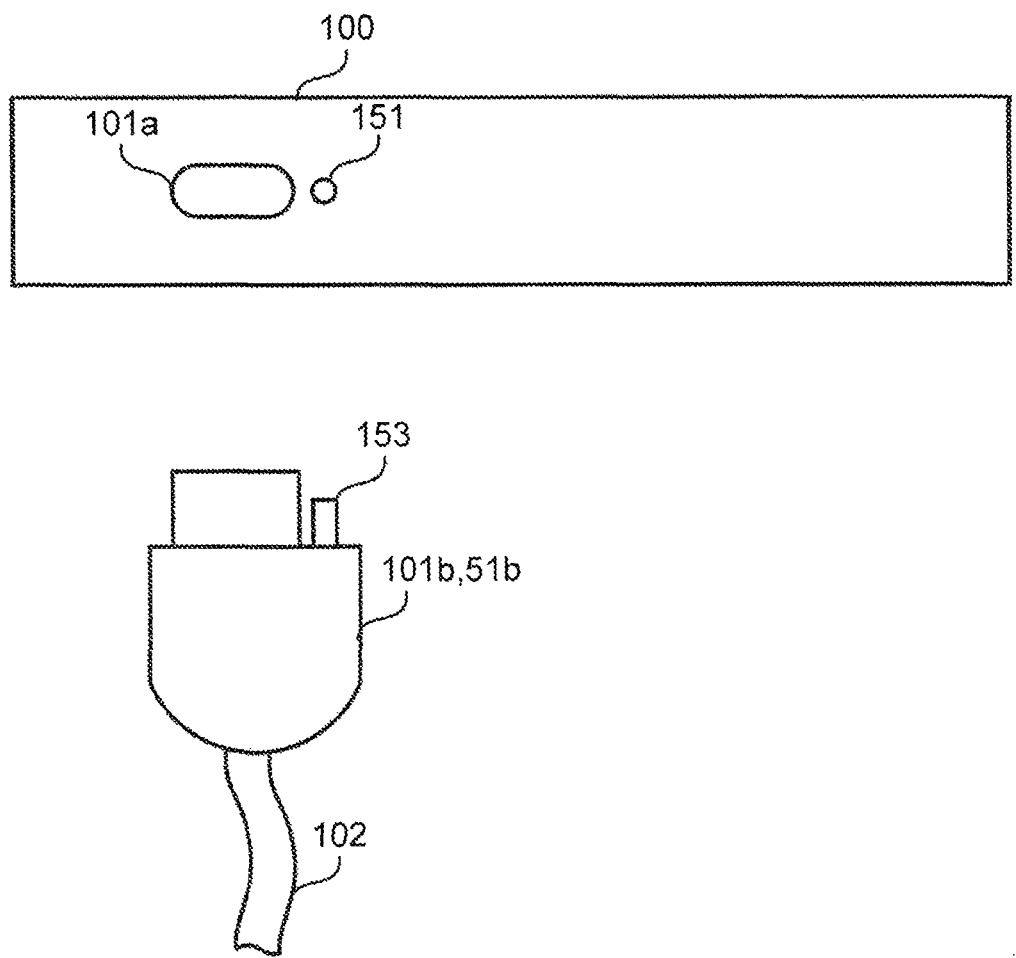
FIG. 4 is a diagram illustrating a structure for inhibiting the reverse connection of a plug to a receptacle.

FIG. 4 is a diagram shows a structure for inhibiting the reverse connection of the oriented plug 1011, 51b. The plug 101b, 51b has a lock pin 153 for connection to the receptacle 101a only in a predetermined vertical direction. The lock pin 153 is fitted into an opening 151 formed in the chassis of the PC 100. Therefore, the plug 101b cannot be connected upside down to the receptacle 101a.

This connection corresponds to the oriented connection previously described. The oriented connection uses the receptacle 101a to establish data channels in other standards in addition to the USB data channels. Since the opening 151 does not function as the reverse connection inhibiting structure for the flippable plug 53 without the lock pin 153, the plug 53b can be connected to the receptacle 101a.

V. Output Mode and Pin Configuration

Figure 5A:
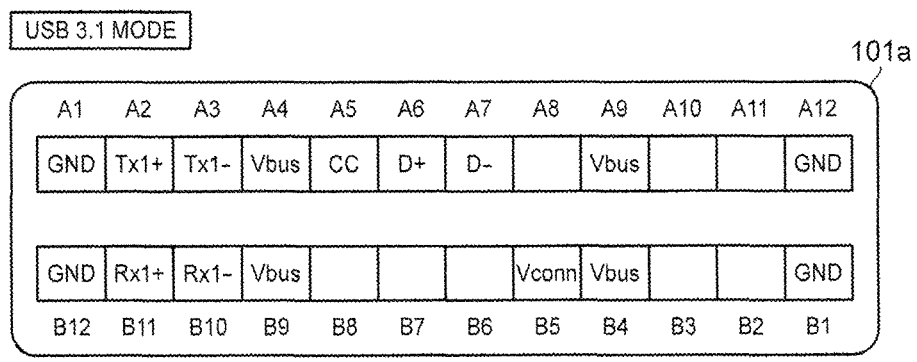
FIGS. 5A-5B show pin configurations in a USB 3.1 mode.
Figure 5B:
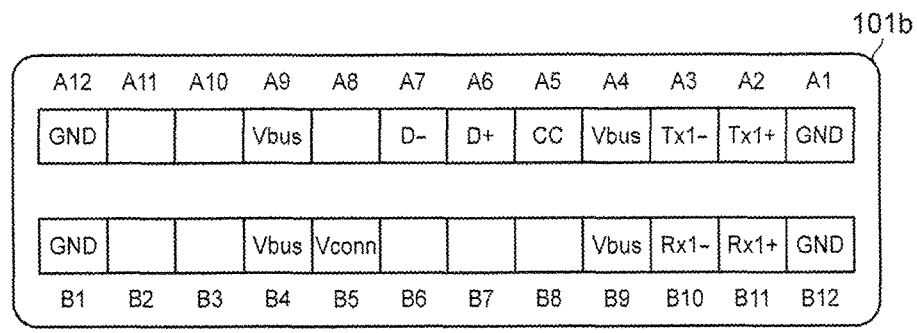
Figure 6A:
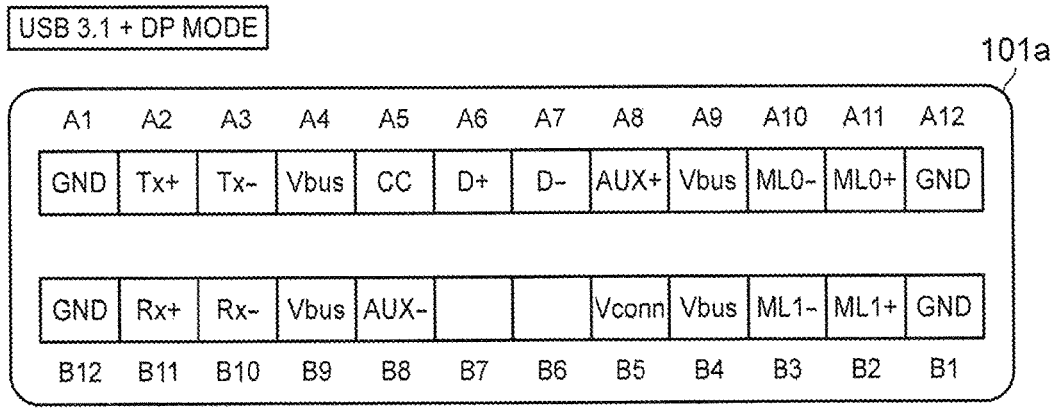
FIGS. 6A-6B show pin configurations in a USB 3.1+DP mode.
Figure 6B:
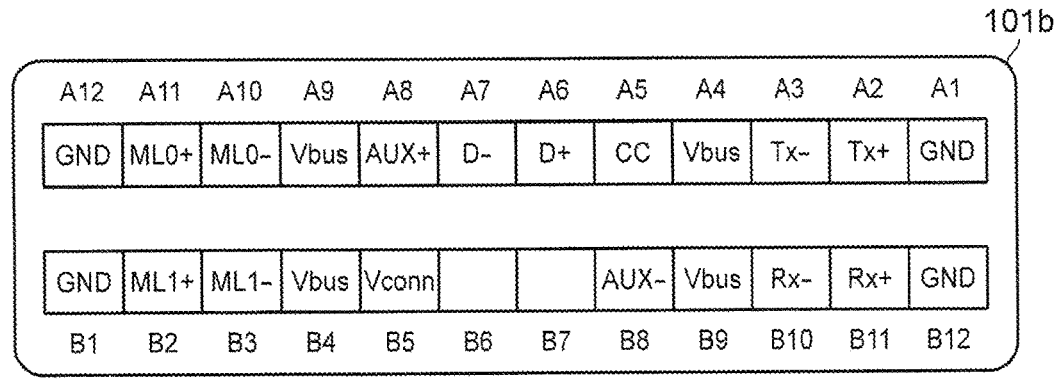
Figure 7A:
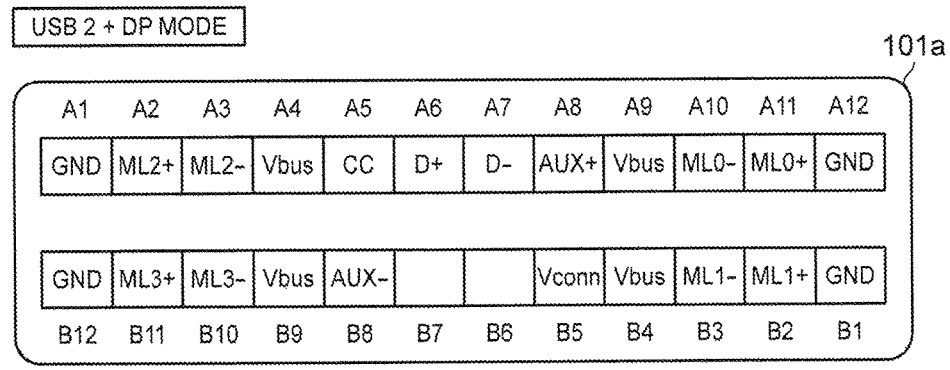
FIGS. 7A-7B show pin configurations in a USB 2+DP mode.
Figure 7B:
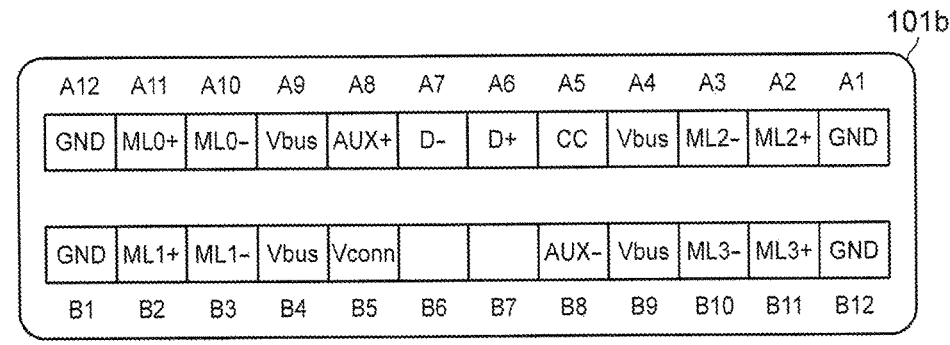
Figure 8A:
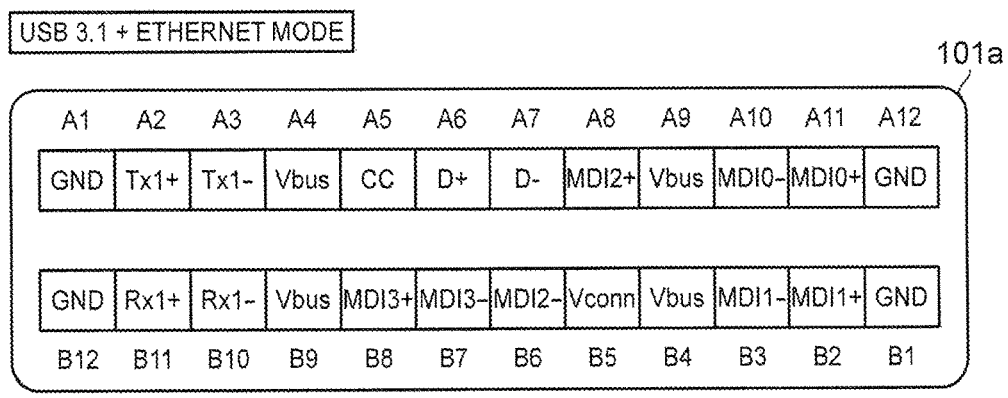
FIGS. 8A-8B show pin configuration in a USB 3.1+ Ethernet mode.
Figure 8B:
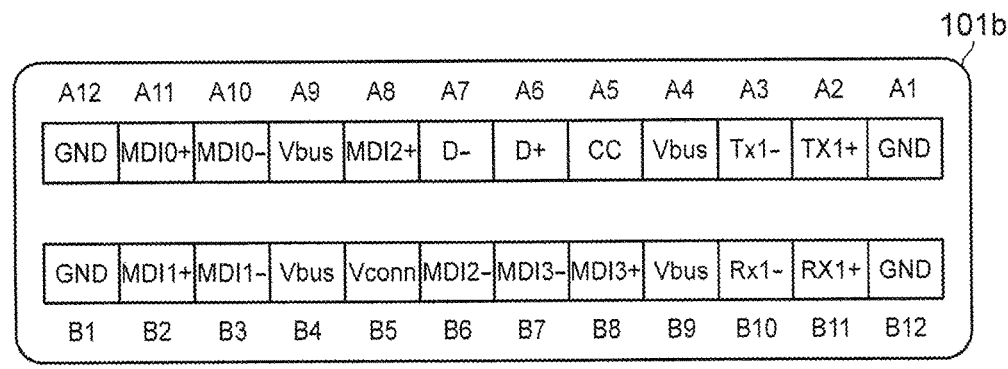

FIGS. 5A-5B show a pin configuration in the USB 3.1 mode, FIGS. 6A-6B sho a pin configuration in the USB 3.1+DP mode. FIGS. 7A-7B show a pin configuration in the USB 2+DP mode. FIGS. 8A-8B show a pin configuration in the USB 3.1+Ethernet mode. FIGS. 5A-5B, FIGS. 6A-6B, FIGS. 7A-7B and FIGS. 8A-8B illustrate a correspondence relationship among signals output to the receptacle 101a in each output mode, the kind of signal received by the plug 101b accordingly, and the pin number. Note that the pin configuration of the plug 51b can be understood from the following description depending on the function of the peripheral device 51.

In the USB 3.1 mode, the crossbar switch 115 configures the A2 and A3 pins as data channels for Tx+/− signals, and configures the B10 and B11 pins as data channels for Rx1+/− signals. In the USB 3.1+DP mode, the crossbar switch 115 configures the A2 and A3 pins as data channels for Tx+/− signals, and configures the B10 and B11 pins as data channels for Rx1+/− signals. The crossbar switch 115 also configures the A10 and A11 pins as data channels for ML0+/− signals, and configures the B2 and B3 pins as data channels for ML1+/− signals. Further, the crossbar switch 115 configures the A8 and B8 pins as data channels for AUX+/− signals.

In the USB 2+DP mode, the crossbar switch 115 configures the A2 and A3 pins as data channels for ML2+/− signals, and configures the B10 and B11 pins as data channels for ML3+/− signals. The crossbar switch 115 also configures the A10 and A11 pins as data channels for ML0+/− signals, and configures the B2 and B3 pins as data channels for ML1+/− signals. Further, the crossbar switch 115 configures the A8 and B8 pins as data channels for AUX+/− signals. In the USB 2+DP mode, although USB 3.1 SuperSpeed or SuperSpeedPlus communication cannot be performed, each speed mode in the USB 2.0 standards is maintained.

In the USB 3.1+ Ethernet mode, the crossbar switch 115 configures the A2 and A3 pins as data channels for Tx+/− signals, and configures the B10 and B11 pins as data channels for Rx+/− signals. The crossbar switch 115 also configures the A10 pin and the A11 pin as data channels for MDI0+/− signals, and configures the B2 pin and B3 pin as data channels for MDI1+/− signals.

Further, the crossbar switch 115 configures the A8 pin as a data channel for MDI2+ signal, and configures the B8 pin as a data channel for MDI3+ signal. The device controller 113 configures the B6 pin as a data channel for MDI2− signal, and configures the B7 pin as a data channel for MDI3− signal. The reconfiguration of the pins described above are just an illustrative example, and any other configuration can be adopted for pins other than the Vbus pin, a GND pin, and the CC pin.

VI. Function Extender

Figure 9:
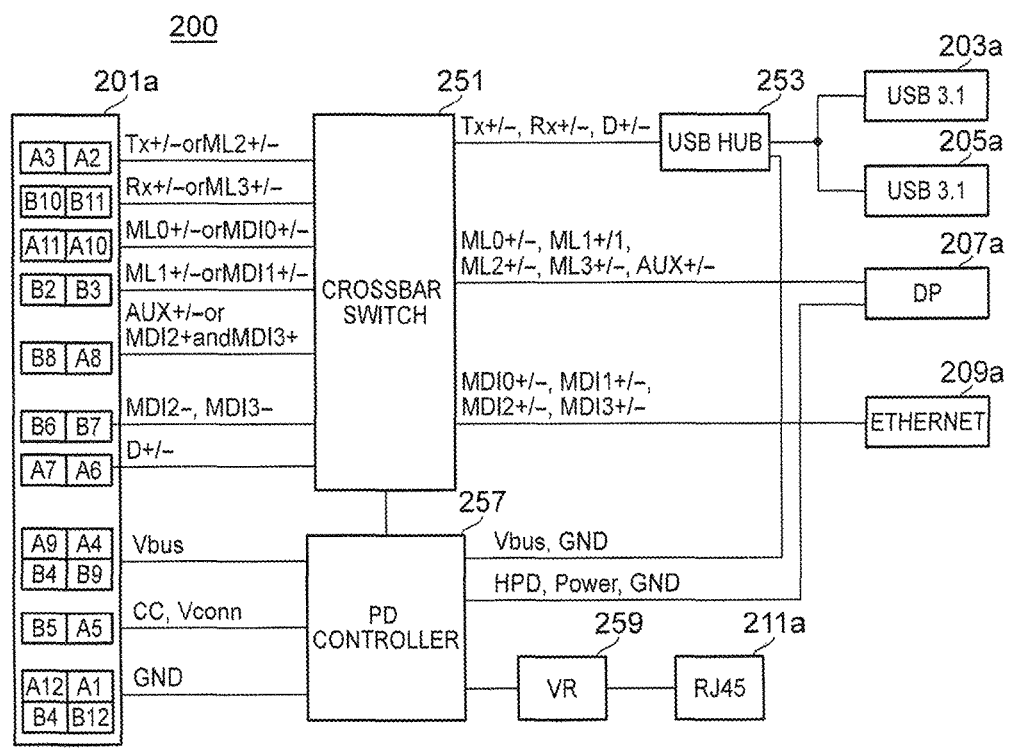
FIG. 9 is a block diagram of a function extender.

FIG. 9 is a block diagram showing the configuration of the function extender 200. The function extender 200 includes the receptacle 201a, a crossbar switch 251, a USB hub 253, a PD controller 257, a voltage regulator 259, and receptacles 203a to 211a. The same pin number as the plug 101b is assigned to the receptacle 201a.

The receptacle 201a and the crossbar switch 251 are connected through data channels corresponding to the data channels 116a to 116e and the data channels 114d and 114e in the PC 100. The receptacle 201a and the PD controller 257 are connected through transmission paths corresponding to the power line 118a, the CC line 118b, and the ground line 118c in the PC 100. The PD controller 257 communicates with the PD controller 117 through the CC line to notify the PD controller 117 of supported external interfaces and network interfaces, and further to receive an instruction of the output mode. The PD controller 257 controls the action of the crossbar switch 251 depending on the output mode.

In the USB 3.1 mode, the crossbar switch 251 establishes data channels for Tx+/− signals, Rx+/− signals, and D+/− signals to the USB hub 253. In the USB 3.1+DP mode, the crossbar switch 251 establishes data channels for Tx+/− signals, Rx+/− signals, and D+/− signals to the USB hub 253, and establishes data channels for ML0+/− signals, ML1+/− signals, and AUX+/− signals to the receptacle 207a. In the USB 2+DP mode, the crossbar switch 251 establishes data channels for D+/− signals to the USB hub 253, and establishes data channels for ML0+/− signals, ML1+/− signals, ML2+/− signals, ML3+/− signals, and AUX+/− signals to the receptacle 207a.

In the USB 3.1+Ethernet mode, the crossbar switch 251 establishes data channels for Tx+/− signals, Rx+/− signals, and D+/− signals to the USB hub, and establishes data channels for MDI0+/− signals, MDI1+/− signals, MDI2+/− signals, and MDI3+/− signals to the receptacle 209a. The PD controller 257 supplies power to the PC 100 through the A4 pin, the A9 pin, the B4 pin, and the B9 pin (Vbus). The PD controller 257 supplies power of a predetermined voltage to the USB hub 253 and the receptacle 207a. The PD controller 257 can detect, through an HPD line, the display 19 connected to the receptacle 207a to inform the PC 100 thereof through the CC line.

The function extender 200 may have a function as a peripheral device such as an HDD, a display, and a network device. The peripheral device 51 (FIG. 1) directly connected to the receptacle 101a via the oriented Type-C plug 51b can be configured to include the crossbar switch 251 and the PD controller 257 in order to include the function of a peripheral device, such as an HDD or a display, working in response to the output of the crossbar switch 251, and the receptacle 209a.

VII. Operating Procedure

Figure 10:
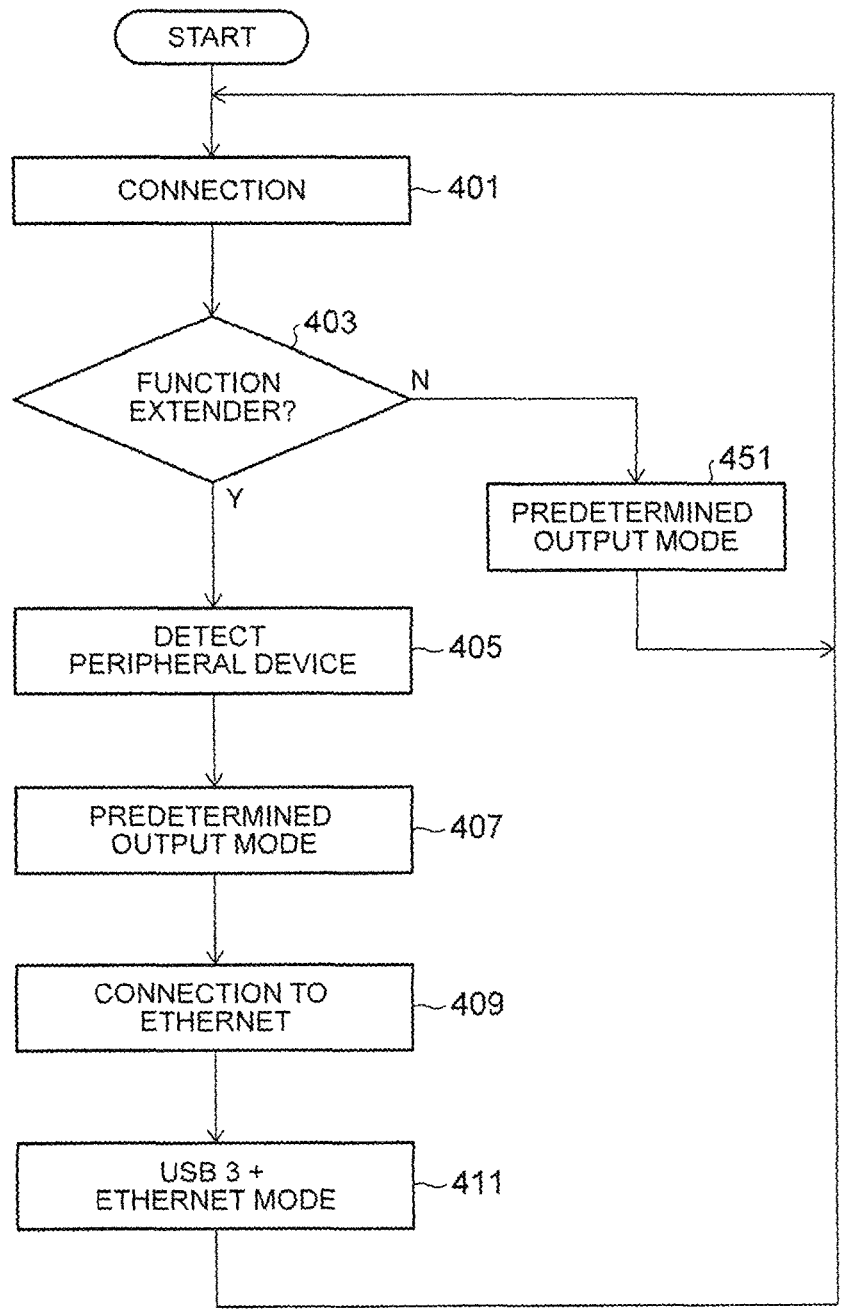
FIG. 10 is a flowchart describing an operating procedure of a personal computer.

FIG. 10 is a flowchart describing an operating procedure of the PC 100. In block 401, any one of the function extender 200, the peripheral device 51, and the peripheral device 53 is connected to the receptacle 101a, of the PC 100. In block 403, the PC 100 recognizes, through the CC line periodically monitored, the connection to an electronic device and an interface for supporting the connection. When either of the peripheral device 51 or the peripheral device 53 is recognized, the procedure moves to block 451.

When recognizing the peripheral device 53, the PC 100 sets the crossbar switch 115 to the USB 3.1 mode in block 451. When recognizing the peripheral device 51, the PC 100 recognizes, through the CC line 118b, an interface supported by the peripheral device 51 to give an instruction of an output mode. When recognizing the function extender 200, the procedure moves to block 405.

In block 405, the host system 111 of the PC 100 recognizes peripheral devices connected to the receptacles 203a to 207a. In block 407, the host system 111 instructs the device controller 113 and the PD controller 117 to set the crossbar switch 115 to any one of the USB 3.1 mode, the USB 3.1+DP mode, and the USB 2+DP mode.

The function extender 200 receiving the instruction of an output mode from the PD controller 117 changes the output mode of the crossbar switch 251. In block 407, the host system 111 instructs the device controller 113 and the PD controller 117 to attach to a network. In block 411, the PD controller 117 sets the crossbar switch 115 to the USB 3.1+Ethernet mode, and the PD controller 257 sets the crossbar switch 251 to the USB 3.1+Ethernet mode.

VIII. System Using Two Receptacles

Figure 11:
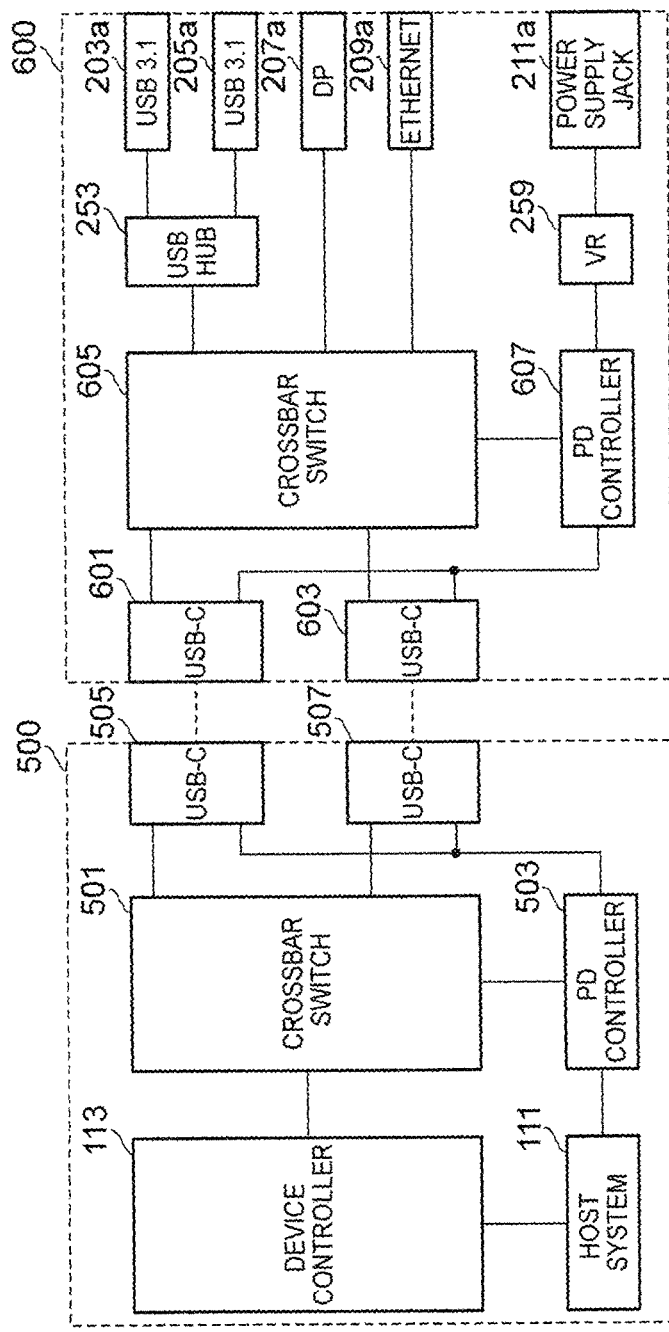
FIG. 11 is a block diagram of a personal computer and a function extender connected to each other via two Type-C connectors.

Although such an example that one Type-C connector is mounted in each of the PC 100 and the function extender 200, respectively, is described so far, mounting of plural Type-C connectors will be able to increase the number of peripheral devices and network devices connectable at the same time. FIG. 11 is a functional block diagram illustrating an example of the configuration of a PC 500 and a function extender 600 connected via two Type-C connectors.

Among components configuring the PC 500 and the function extender 600, components easily understood from the same components as, or components corresponding to, those of the PC 100 (FIG. 3) and the function extender 200 (FIG. 9) are given the same reference numerals to omit the description thereof. The PC 500 has Type-C receptacles 505 and 507. As an example, a PD controller 503 can control a crossbar switch 501 to configure the receptacle 505 in the USB 2+DP mode or the USB 3.1+DP mode, and configure the receptacle 507 in the USB 3.1+Ethernet mode.

The function extender 600 has Type-C receptacles 601 and 603. The receptacle 601 is connected to the receptacle 505 via an oriented plug. The receptacle 603 is connected to the receptacle 507 via an oriented plug. A PD controller 607 controls a crossbar switch 605 to route the data channel of the receptacle 601 to a USB hub 253 and the receptacle 207a according to an instruction from the PC 500. The PD controller 607 also controls the crossbar switch 605 to route the data channel of the receptacle 603 to the USB hub 253 and the receptacle 209a.

The use of the function extender 600 enables a four-lane DP data channel to be established in the receptacle 207a to connect the 4K display 19 and to connect the network device 21 to the receptacle 209a at the same time merely by providing the receptacles 505 and 507. Further, USB devices can be connected to the receptacles 203a and 205a to perform USB 3.1 data transmission. Note that three or more Type-C receptacles may be provided.

As has been described, the present disclosure provides a technique for connecting as many interfaces as possible to one single connector that is included in a portable electronic device.

While the disclosure has been particularly shown and described with reference to a preferred embodiment, it will be understood by those skilled in the art that various changes in form and detail may be made therein without departing from the spirit and scope of the disclosure.

What is claimed is:

1. An electronic device comprising:
    a host system;
    a device controller includes a first data channel for communicating with a peripheral device and a second data channel for communicating with a network device;
    a first receptacle for simultaneously providing a peripheral interface for said first data channel and a network interface for said second data channel;
    a crossbar switch, connected between said device controller and said first receptacle, switches between said first and second data channels of said device controller to establish said peripheral interface and said network interface in said first receptacle; and
    a power delivery controller connected to said host system via a first serial bus, and connected to said crossbar switch via a second serial bus.

2. The electronic device of claim 1, wherein said peripheral interface includes a first external interface and a second external interface, and said crossbar switch selects one of a combination of said first external interface, said second external interface, and said network interface.

3. The electronic device of claim 2, wherein said first external interface is a Universal Serial Bus (USB) interface, said second external interface is a display interface, and said network interface is an Ethernet.

4. The electronic device of claim 1, wherein said first receptacle is of a Universal Serial Bus (USB) Type-C.

5. The electronic device of claim 4, wherein said first receptacle further includes a reverse connection inhibiting structure for a plug to be connected to said first receptacle.

6. The electronic device of claim 5, wherein said plug having said reverse connection is allowed to be connected to said first receptacle to establish a data channel for a USB interface.

7. The electronic device of claim 2, wherein said crossbar switch establishes, between said device controller and said first receptacle, a data channel shared by said second external interface and said network interface.

8. The electronic device of claim 2, wherein said device controller establishes, between said device controller and said first receptacle, data channels for said network interface.

9. The electronic device of claim 1, wherein said host system is connected to said device controller via a data bus.

10. An electronic device comprising:
    a host system;
    a device controller includes a first data channel for communicating with a peripheral device and a second data channel for communicating with a network device;
    a first receptacle for simultaneously providing a peripheral interface for said first data channel and a network interface for said second data channel, wherein said peripheral interface includes a first external interface and a second external interface; and
    a crossbar switch, connected between said device controller and said first receptacle, switches between said first and second data channels of said device controller to establish said peripheral interface and said network interface in said first receptacle, wherein said crossbar switch selects one of a combination of said first external interface, said second external interface, and said network interface to provide a Universal Serial Bus (USB)+display port mode at said first receptacle.

11. The electronic device of claim 10, wherein said crossbar switch selects said first external interface, said second external interface, and said network interface to provide a USB+Ethernet mode at said first receptacle.

12. An electronic device comprising:
    a host system;
    a device controller includes a first data channel for communicating with a peripheral device and a second data channel for communicating with a network device;
    a first receptacle for simultaneously providing a peripheral interface for said first data channel and a network interface for said second data channel; and
    a crossbar switch, connected between said device controller and said first receptacle, switches between said first and second data channels of said device controller to establish said peripheral interface and said network interface in said first receptacle, wherein said electronic device is connected to a function extender having
        a second receptacle connected to said first receptacle of said electronic device;
        a plurality of peripheral receptacles to allow a peripheral device to be connected to said electronic device;
        a network receptacle to allow a network device to be connected to said electronic device; and
        a crossbar switch to route data channels between said second receptacle and said peripheral and network receptacles.

13. The electronic device of claim 1, wherein said device controller further includes a Universal Serial Bus controller, a display port controller and an Ethernet controller.

* * * * *